United States Patent [19]

Hand et al.

[11] Patent Number: 5,083,897
[45] Date of Patent: Jan. 28, 1992

[54] DECK FOR METERING LOGS TO DEBARKING DRUM INFEED CHUTE

[75] Inventors: Jimmy W. Hand, Blountstown, Fla.; Charles D. Sparks, Birmingham, Ala.

[73] Assignee: FMP/Rauma Company, Birmingham, Ala.

[21] Appl. No.: 540,890

[22] Filed: Jun. 21, 1990

Related U.S. Application Data

[63] Continuation of Ser. No. 324,421, Mar. 16, 1989, abandoned.

[51] Int. Cl.⁵ .................................................. B66F 11/00
[52] U.S. Cl. ............................. 414/746.4; 414/745.7; 221/289; 193/32; 198/532
[58] Field of Search ......... 144/340, 341, 342, 208 B; 209/517; 221/289, 194; 414/746.7, 745.7, 745.8, 745.9, 746.1, 746.3, 746.2, 746.4; 198/530, 532; 193/32, 40

[56] References Cited

U.S. PATENT DOCUMENTS

| | | | |
|---|---|---|---|
| 1,721,835 | 7/1929 | Schnell | 193/40 |
| 2,763,236 | 9/1956 | Cummings | 414/746.4 X |
| 2,880,844 | 4/1959 | Vogeli | 414/746.4 X |
| 3,306,472 | 2/1967 | Blanz | 414/746.4 |
| 3,330,401 | 7/1967 | Ahlstedt | 193/32 X |
| 3,390,488 | 7/1968 | Carpenter, Jr. et al. | 414/746.4 X |
| 3,400,837 | 9/1968 | Dalik | 414/746.4 X |
| 3,587,822 | 6/1971 | White | 414/746.4 X |
| 3,783,918 | 1/1974 | Simpson et al. | |
| 3,812,951 | 5/1974 | Fullaway | |
| 3,863,902 | 2/1975 | O'Brien et al. | |
| 3,871,288 | 3/1975 | White | 414/746.4 X |
| 3,948,300 | 4/1976 | Young | 144/208 B |
| 4,245,735 | 1/1981 | Valo | 414/745.9 X |
| 4,930,616 | 6/1990 | Lindberg | 414/746.4 X |

FOREIGN PATENT DOCUMENTS

| | | | |
|---|---|---|---|
| 2043142 | 6/1971 | Fed. Rep. of Germany | 221/289 |
| 2245117 | 9/1972 | Fed. Rep. of Germany | 414/746.4 |
| 0077368 | 6/1977 | Japan | 414/746.4 |
| 151963 | 1/1962 | U.S.S.R. | 414/746.4 |
| 652069 | 3/1979 | U.S.S.R. | 414/746.4 |
| 1041469 | 9/1983 | U.S.S.R. | 414/746.4 |
| 1293090 | 2/1987 | U.S.S.R. | 414/746.4 |

OTHER PUBLICATIONS

"New Woodyard Receives, Debarks, Chips Wood in Lengths to 55 Feet", Pulp and Paper Staff Report, *Pulp and Paper*, Jul. 1987, pp. 101-102.

Flathmann, W. E., "Fiber Raw Materials-Wood Procurement, Debarking and Chipping", *Paper Age*, Jul. 1987, p. 34.

Flathmann, "Tree Length Stem Storage . . .", pp. 319-323, 1989, Pulping Conference/TAPPI Proceedings.

*Primary Examiner*—David A. Bucci
*Assistant Examiner*—William M. Hienz
*Attorney, Agent, or Firm*—Marshall, O'Toole, Gerstein, Murray & Bicknell

[57] ABSTRACT

Apparatus for feeding logs into a feed chute comprising a dead deck extending laterally outwardly and sloping upwardly at least from a feed chute first side top edge; the sloping dead deck being capable of supporting a grapple load pile of side-by-side logs substantially parallel to the chute opening; the sloping dead deck having a lower portion with a front edge from which logs can roll off and fall into the chute; and the sloping dead deck lower front portion having a plurality of stops movable from a first position, which retains a complete pile of logs on the dead deck, to different positions suitable for metering the long logs by gravity into the chute.

5 Claims, 6 Drawing Sheets

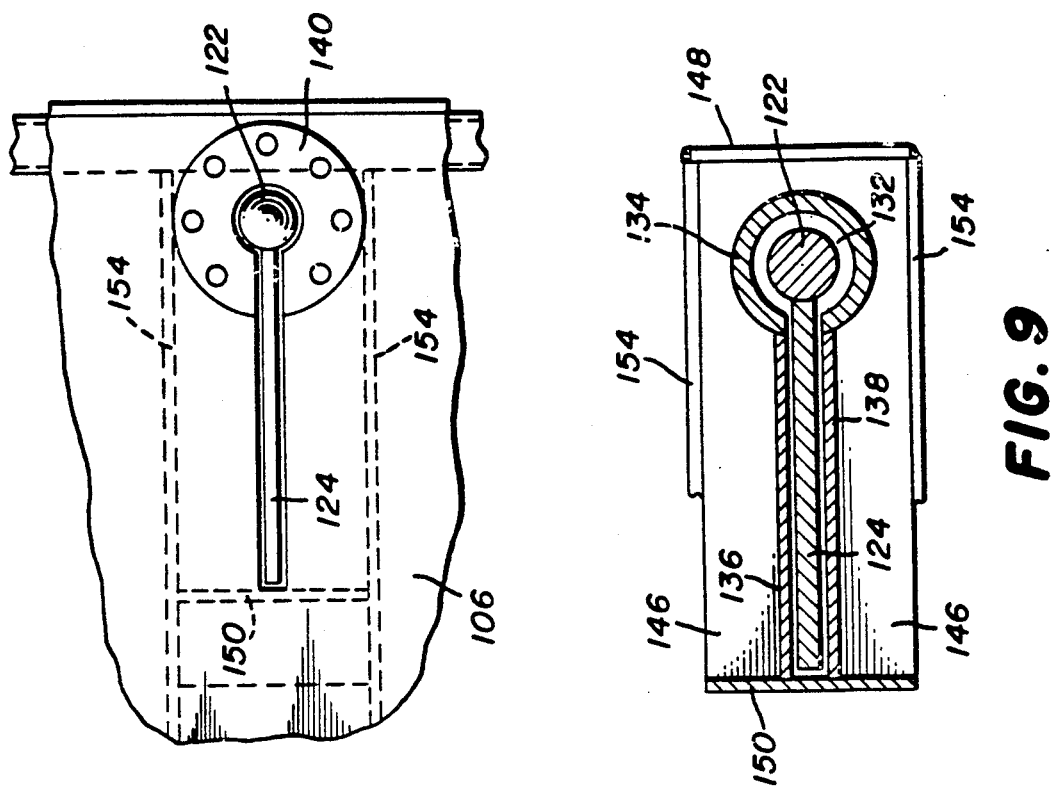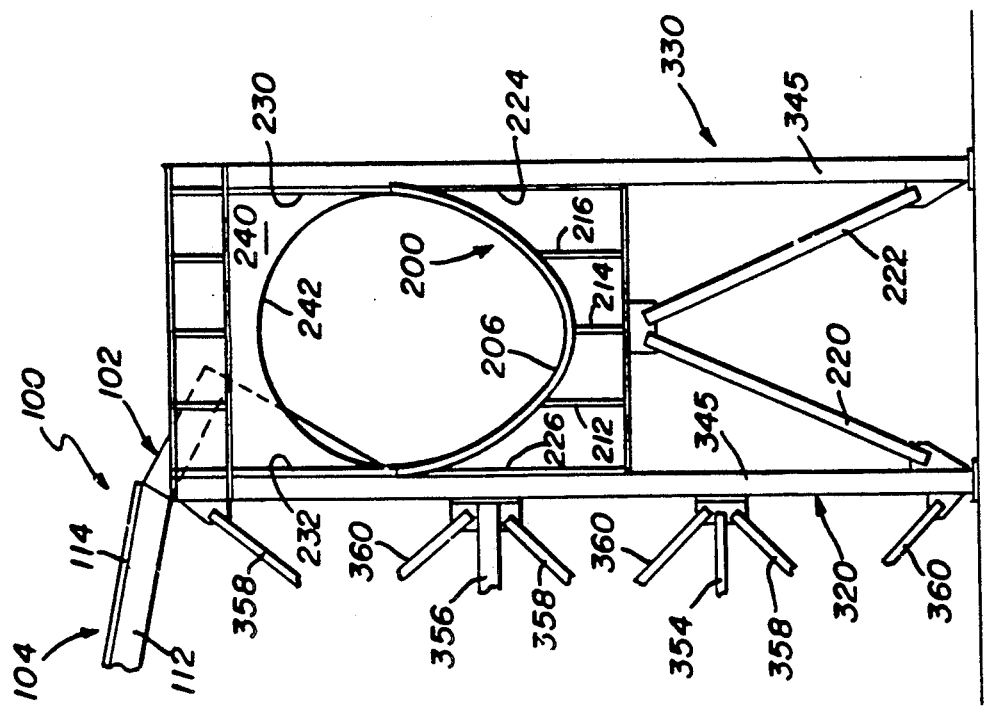

DECK FOR METERING LOGS TO DEBARKING DRUM INFEED CHUTE

This application is a continuation of application Ser. No. 07/324,421, filed Mar. 16, 1989, now abandoned.

This invention relates to apparatus for handling logs to be fed to a delivery chute. More particularly, this invention is concerned with a method of metering logs to a feed chute and with a deck for receiving logs for their metered feeding to a delivery chute, particularly a chute feeding the logs to a debarking drum.

BACKGROUND OF THE INVENTION

In the manufacture of paper, clean bark free wood is an essential element. One of the means of separating the bark from the wood is by processing the logs through a debarking drum, which is a large rotating cylindrical steel shell normally oriented horizontal or near horizontal. The shell has a multitude of openings which provide a means for loose bark and debris to be separated from the log stream. Logs are fed into one end of the debarking drum and clean or debarked logs exit the other end. Many factors affect the efficiency of the debarking and subsequent processing operations. It has been found that uniformity of log flow is significant among these factors. If large numbers of logs are fed into a drum simultaneously, the logs are often poorly debarked, there is a tendency for large numbers of logs to subsequently exit simultaneously and create log jams in the conveyors downstream, and a generally inefficient operation results.

Currently, control of the feed rate or metering of the logs to the debarking drum is accomplished in one of two ways.

One way is by direct feed of the logs to the debarking drum feed chute with a crane utilizing small bites, or by gradually releasing the logs while they hover over the feed chute. The device that actually holds the logs on the end of the crane, a grapple, is quickly opened and closed to release small numbers of logs. It is an effective means of metering, but significantly adds to the crane utilization cycle time. Since log carrying trucks normally make deliveries only during daylight hours, a sufficient number of trucks must also be unloaded to stockpile wood for night time production. Additional lifting equipment is often dictated because of extended crane cycle time.

A second way of metering logs to the chute is by means of large live load decks and conveyors. The crane grapple quickly releases its entire load onto the live load deck and then the logs are subsequently moved into the chute by a multitude of chains driven by a large variable speed hydraulic or electro-mechanical system. This provides a live deck action which gives uniform feed and further provides surge storage so that the crane can quickly release its load. However, this method represents a significant capital investment with continuing operating and maintenance costs for the large chain transport system on the deck.

SUMMARY OF THE INVENTION

The invention provides a method and apparatus which permits instantaneous release of full grapple loads of logs, use of a larger grapple than would normally be suitable for a conventional direct crane feed system, and gradual metering by gravity of full grapple loads into a feed chute without the large capital and maintenance cost inherent in the previous equipment.

According to one aspect of the invention a method of metering logs to a feed chute is provided comprising depositing a large grapple load constituting a plurality of logs in substantially parallel arrangement as a pile on a supporting means over which logs can move from the pile by gravity in a direction lateral to the length of the logs toward a log drop-off edge from which the logs are deposited in a feed chute; and regulating the rate of movement of the logs along the supporting means and over the drop-off edge by adjusting log stop means located along the drop-off edge so as to meter the flow of logs into the feed chute at a rate such that the feed chute can accept the logs and deliver them to a destination at a rate where they can be acceptably received and effectively processed.

The supporting means can provide a substantially continuous surface and can constitute a dead deck which slopes toward the feed chute. The drop-off edge can constitute a longitudinal edge of the surface. Also, the longitudinal edge can adjoin the feed chute and, more specifically, the longitudinal edge can be above the feed chute.

The stop means can comprise a plurality of fingers displaceable substantially normal or perpendicular with respect to the deck. Furthermore, the fingers can be arranged spaced apart from adjacent fingers in substantially linear arrangement.

The method is especially useful when the destination to which the feed chute delivers the logs is a debarking drum. This is because metered feeding of the logs, particularly long logs, leads to a more efficient debarking operation and better removal of the bark.

By "dead deck" is meant a deck which does not require drive chains or other mechanical, hydraulic or electro-mechanical means to move logs over a deck surface and into a feed chute.

According to a second aspect of the invention there is provided apparatus for feeding logs into a feed chute comprising a dead deck extending laterally outwardly and sloping upwardly at least from adjacent a feed chute first side top edge; the sloping dead deck being capable of supporting a grapple load pile of side-by-side logs substantially parallel to the chute opening; the sloping dead deck having a lower portion with a front edge from which logs can roll off and fall into the chute; and the sloping dead deck lower front portion having stop means which is movable from a first position, which retains a complete pile of logs on the dead deck, to different positions suitable for metering the long logs by gravity into the chute.

According to a further aspect of the invention there is provided an apparatus for feeding logs into a feed chute, such as a debarking drum feed chute, comprising a generally U-shaped feed chute curved at the bottom and with a log receiving open top and downwardly sloping from an upper end to a lower delivery end; the feed chute having opposing spaced apart upwardly extending first and second sides and with at least the first side having a substantially horizontal top edge; a dead deck extending laterally outwardly and sloping upwardly from adjacent the chute first side top edge; the sloping dead deck being capable of supporting a grapple load pile of side-by-side logs substantially parallel to the chute opening; the sloping dead deck having a front portion with a front edge from which logs can roll off and fall into the chute; and the sloping dead deck front portion having stop means which is movable from a first position, which retains a complete pile of logs on the dead deck, to different positions suitable for metering the logs into the chute.

The lower edge of the deck can be substantially horizontal and the chute upper end curved bottom and the lower edge of the deck can be substantially adjacent each other.

The dead deck front portion can project over the chute first side edge part way towards the chute second side. The dead deck front portion projecting over the chute first side edge can have a greater angle of slope than the other part of the dead deck.

Most of the dead deck can slope at an angle of about 10 to 20° although the dead deck front portion can slope at an angle from about 20 to 35°. The difference between the slope angles can generally be at least 10°.

The log stop means can comprise a plurality of fingers displaceable substantially normal or perpendicular with respect to the deck lower front portion. The fingers can be arranged spaced apart from adjacent fingers in a substantially linear arrangement.

The fingers can be vertically displaceable by hydraulic means. At least some of the fingers can comprise a metal rod connected to a piston rod of the hydraulic means; and the metal rod can have means which logs contact and are thereby temporarily restrained against gravity movement down the sloped deck into the chute.

The metal rod can have a metal plate connected radially and axially to the rod with the plate having an outer radially positioned edge which the logs contact. The plate radial edge can slope downwardly and outwardly from the top of the metal rod.

The apparatus can also include guide means for axial displacement of the rod and/or the metal plate.

The guide means can include a tube, desirably stationary, telescopically arranged with respect to the metal rod and a stationary slot in which the metal plate is displaceable.

The dead deck is particularly useful for metering long logs or tree length logs into the feed chute; however, it is also useful for metering shorter logs which have a length at least slightly longer than the distance between a pair of adjoining log stop fingers.

BRIEF DESCRIPTION OF THE DRAWINGS

FIG. 7 is an end elevational view taken along the line 7—7 of FIG. 1;

FIG. 8 is a view taken along the line 8—8 of FIG. 6; and

FIG. 9 is a sectional view taken along the line 9—9 of FIG. 6.

DETAILED DESCRIPTION OF THE DRAWINGS

Figure 1:
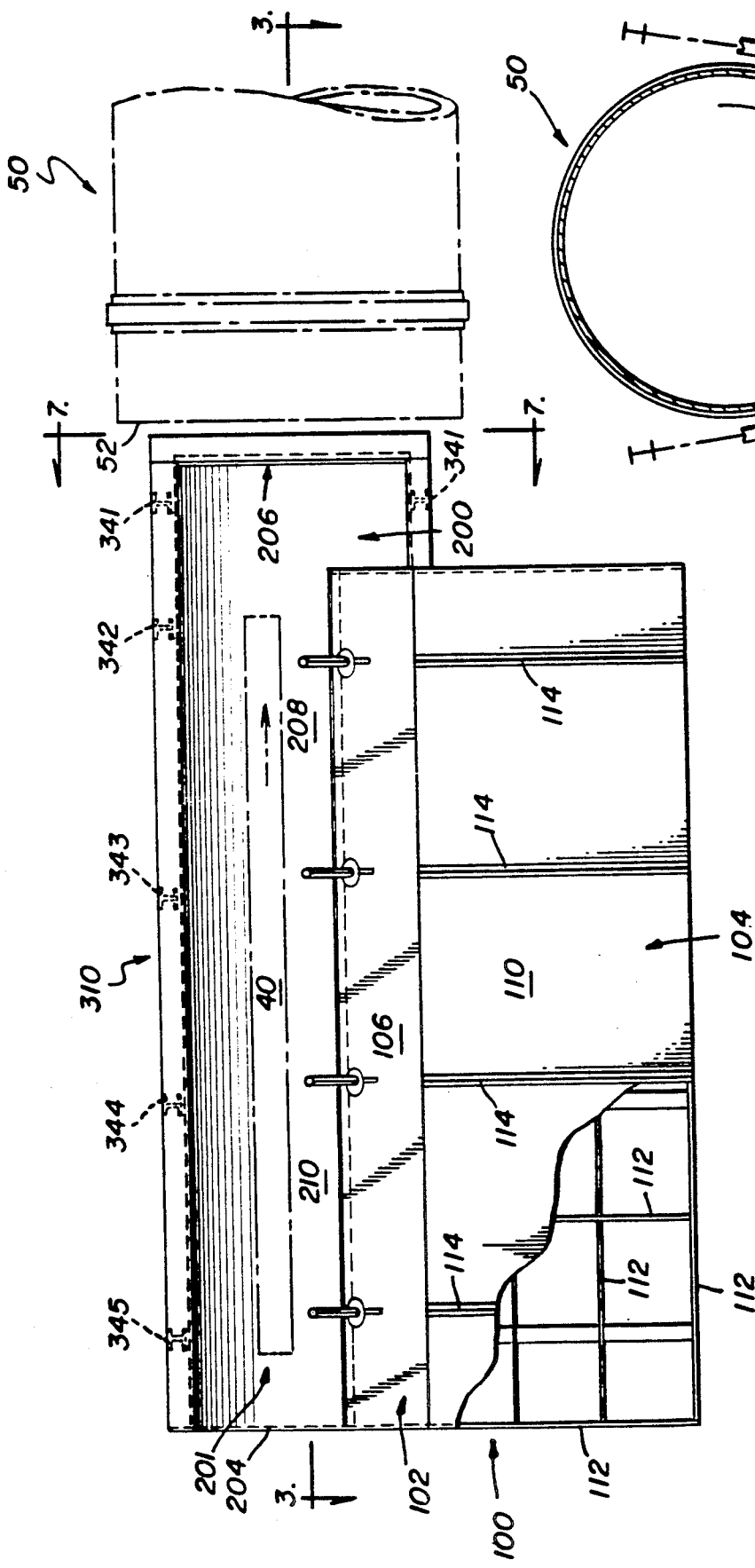
FIG. 1 is a plan view of one embodiment of apparatus provided by the invention for feeding logs into a feed chute.

To the extent it is reasonable and practical the same or similar parts or elements which appear in the various views of the drawings will be identified by the same numbers.

With reference to the drawings, and particularly FIGS. 1 to 4 and 7, the dead deck 100 and the feed chute 200 are supported by a framework 300. The framework 300 includes a plurality of columns arranged in spaced apart parallel rows 310,320,330. Each row 320,330 of columns contains five spaced apart columns 341,342,343,344,345 although more or less columns may be used. The row 310 of columns, however, contains only four columns 342,343, 344,345. Horizontal beams 352,354 and 356 interconnect with adjacent columns in the same rows and in adjoining rows to support the columns. Additional column support is provided by cross braces 358,360.

The feed chute 200 is generally U-shaped and has a curved bottom 201. The feed chute for logs 40 has a log receiving open top 202 and is downwardly sloping from an upper end 204 to a lower log delivery end 206 located in close proximity to the inlet end 52 of debarking drum 50.

Figure 3:
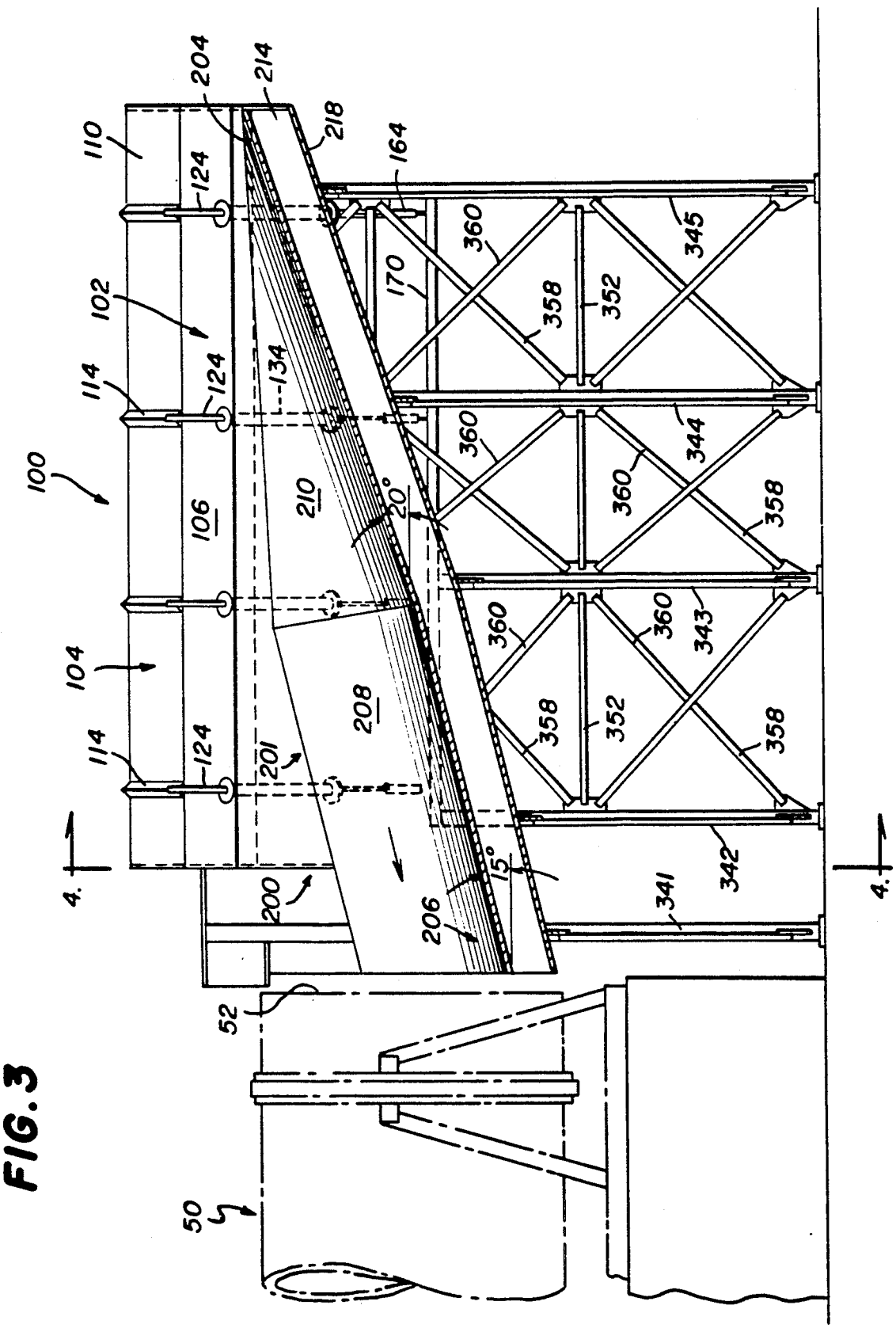
FIG. 3 is a sectional view taken along the line 3—3 of FIG. 1.

The feed chute 200 curved bottom 201 is desirably made in two sections of very heavy metal plate. The feed chute curved lower section 208 is set at an angle of about 15° from the horizontal while the feed chute curved upper section 210 is set at an angle of about 20° from the horizontal (FIG. 3).

The curved bottom 201 of feed chute 200 is reinforced externally by three spaced apart vertical plates 212,214,216 positioned longitudinally of the feed chute 200. The top edge of plates 212,214,216 is joined to the lower surface of the feed chute bottom 201 by welding. Similarly, the lower edge of plates 212,214,216 is joined to horizontal longitudinal support plate 218 which is supported at its longitudinal edges by the columns in rows 320,330 and such other beams as may be required. Horizontal support plate 218 is itself reinforced by diagonal braces 220,222 spaced along the length of the feed chute and joined to the columns in rows 320,330.

Further support for the feed chute curved bottom 201 is provided by vertical plate 224 joined to the columns in row 330 and the vertical plate 226 joined to the columns in row 320. Each of the plates 224,226 extends upwards from horizontal plate 218 and terminates just below the top edge of the chute curved bottom 201 to which it is joined.

Figure 4:
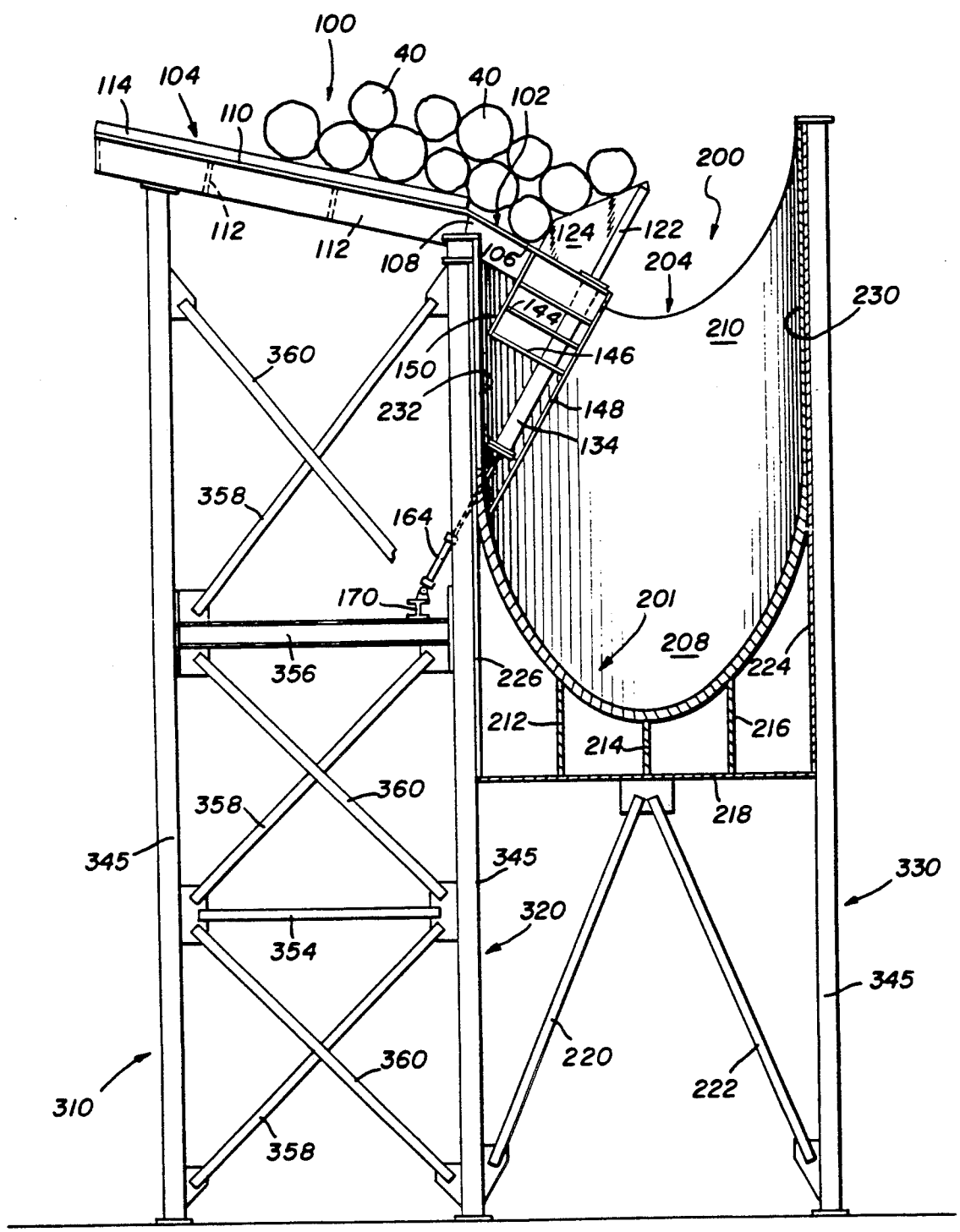
FIG. 4 is a sectional view taken along the line 4—4 of FIG. 3.

The feed chute also has a pair of opposing spaced apart upwardly extending sides defined by plates 230,232 (FIG. 4). The plates 230,232 are joined to the respective columns in rows 320,330. Additionally, the lower edges of the plates 230,232 are joined to the respective top edges of the feed chute curved portion 201. The top edge of plate 232 is desirably horizontal and located close to the tops of the columns in row 320 and close to the underside of the dead deck 100. Furthermore, the top edge of plate 230 is desirably horizontal and located near the top of the columns in row 330.

The log delivery end of the feed chute 200 is provided with a vertical guide plate 240 (FIG. 7) having a semicircular bottom edge 242. The edge 242 defines the upper part, and the feed chute front edge 206 the lower part, of an opening through which the logs 40 slide into the debarking drum 50.

The sloping dead deck 100 is supported by the columns in rows 310,320. The dead deck 100 extends at least laterally outwardly and slopes upwardly from the top edge of the side of the feed chute 200 adjoining the columns in row 320. The sloping dead deck 100 has a front portion 102 and a primary log supporting rectangular portion 104. The front portion 102 can have the same angle of slope as the deck primary portion 104. However, it is preferred to increase the angle of slope of the front portion 102 to an angle greater than that of the primary portion 104. Thus, the primary portion can have a slope of 12.5° and the front portion 102 can have a slope of 30°.

The feed deck front portion has a top flat metal plate 106. Criss-cross reinforcing plates 108 are welded perpendicular to the bottom of plate 106. Similarly, the primary log supporting portion 104 has a top sloping flat plate 110. Criss-cross reinforcing plates 112 are welded perpendicular to the bottom of plate 110. Four inverted spaced apart parallel metal angles 114 are welded to the upper surface of plate 110 in a position approximately lateral to feed chute 200. The angles 114 constitute rails on which the logs 40 readily slide solely by gravity downwards on the sloping dead deck 100.

The deck front portion 102 is provided with four spaced apart log stop fingers 120. Each of the fingers 120 includes a long round rod 122 to which flat metal plate 124 is axially welded. Plate 124 has an outer edge 126 parallel to rod 122 and a lower edge 128 perpendicular to rod 122. The plate 124 upper edge 130 slants downwardly and outwardly from the top of metal rod 122 to edge 126. Polymeric liner 132 (FIGS. 8 and 9) substantially surrounds rod 122 and, in turn, stationary metal tube 134 substantially surrounds liner 132. Thus, rod 122 and tube 134 are telescopically arranged with respect to each other. The rod 122 is telescopically movable in the tube 134. The metal plate 124 is positioned between guide plates 136,138 which define a slot with adequate clearance so that plate 124 can be displaced therein. Retaining disc 140 is releasably secured to the top of plate 106 to keep the liner 132 in place.

The tube 134 is supported by strip plates 142,144,146 as well as top plate 106. The tube 134 extends through aligned holes in plates 142,144,146 and is welded to the plates. Front strip plate 148 (FIG. 6) is axially aligned with tube 134 and serves to protect it against battering by logs in the feed chute. Rear strip plate 150, also axially aligned with tube 134, is joined to the ends of plates 142,144,146 and also to the bottom of top plate 106. The plates 106,142,144,146 are each provided with an oversized slot defined by vertical spaced apart plates 136,138 which are joined to plates 106,142,144,146. The side edges of plates 142,144,146 are covered by a pair of spaced apart vertical plates 154.

The lower end of stationary tube 134 is provided with a ring flange 156 to which removable disc plate 158 can be bolted to secure the liner 132 in tube 134. The lower end of rod 122 is joined to the outer end of piston rod 160 by pin 162. The inner end of piston rod 160 is connected to a piston (not shown) in hydraulic cylinder 164.

Beam 170 is mounted on top of cross beams 356. A vertical support 172 is mounted on top of beam 170 and the lower end of hydraulic cylinder 164 is connected to the support by pin 174.

Figure 5:
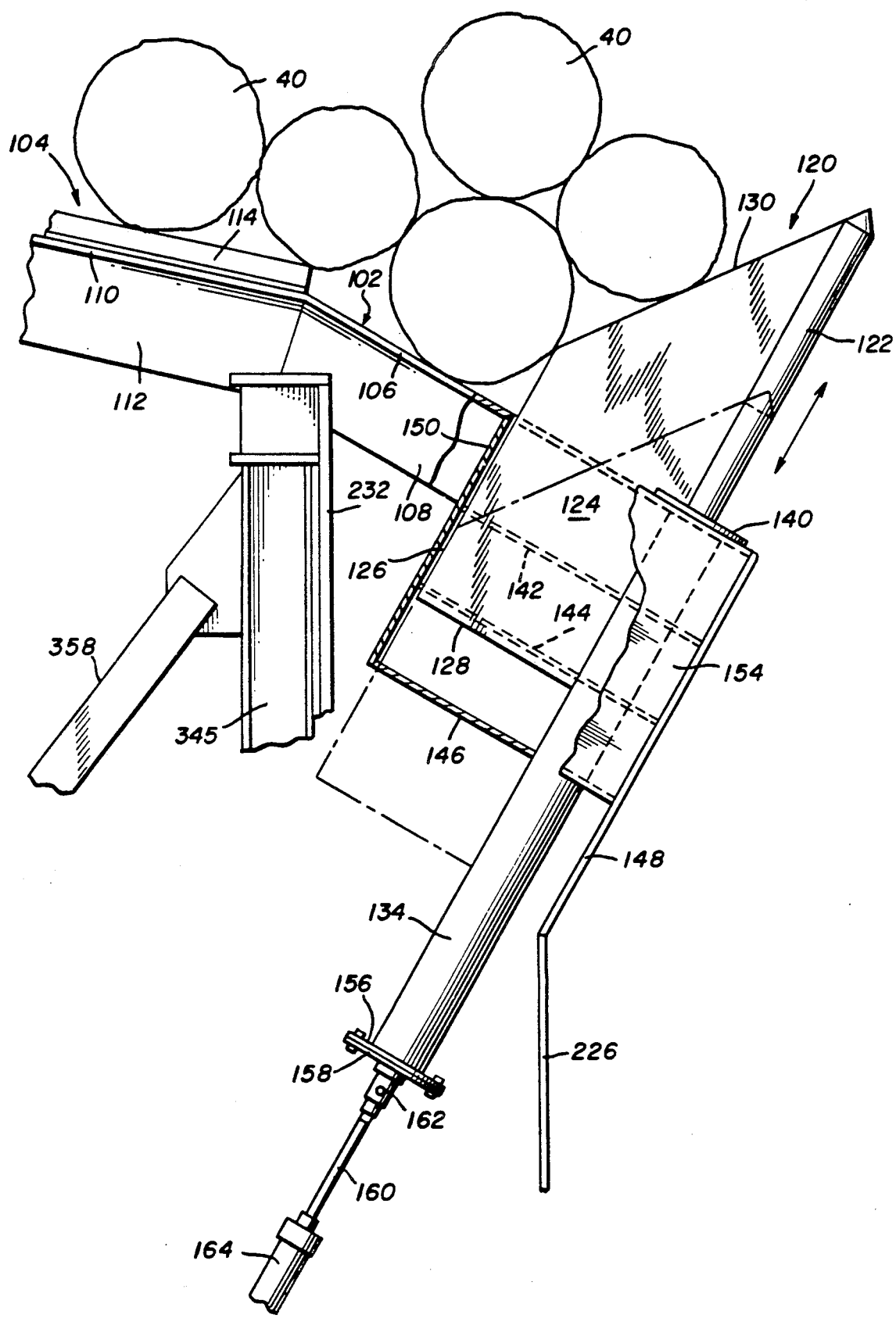
FIG. 5 is an enlarged view of the dead deck lower front portion shown in FIG. 4 with the log stop means shown in partially and fully extended positions.
Figure 6:
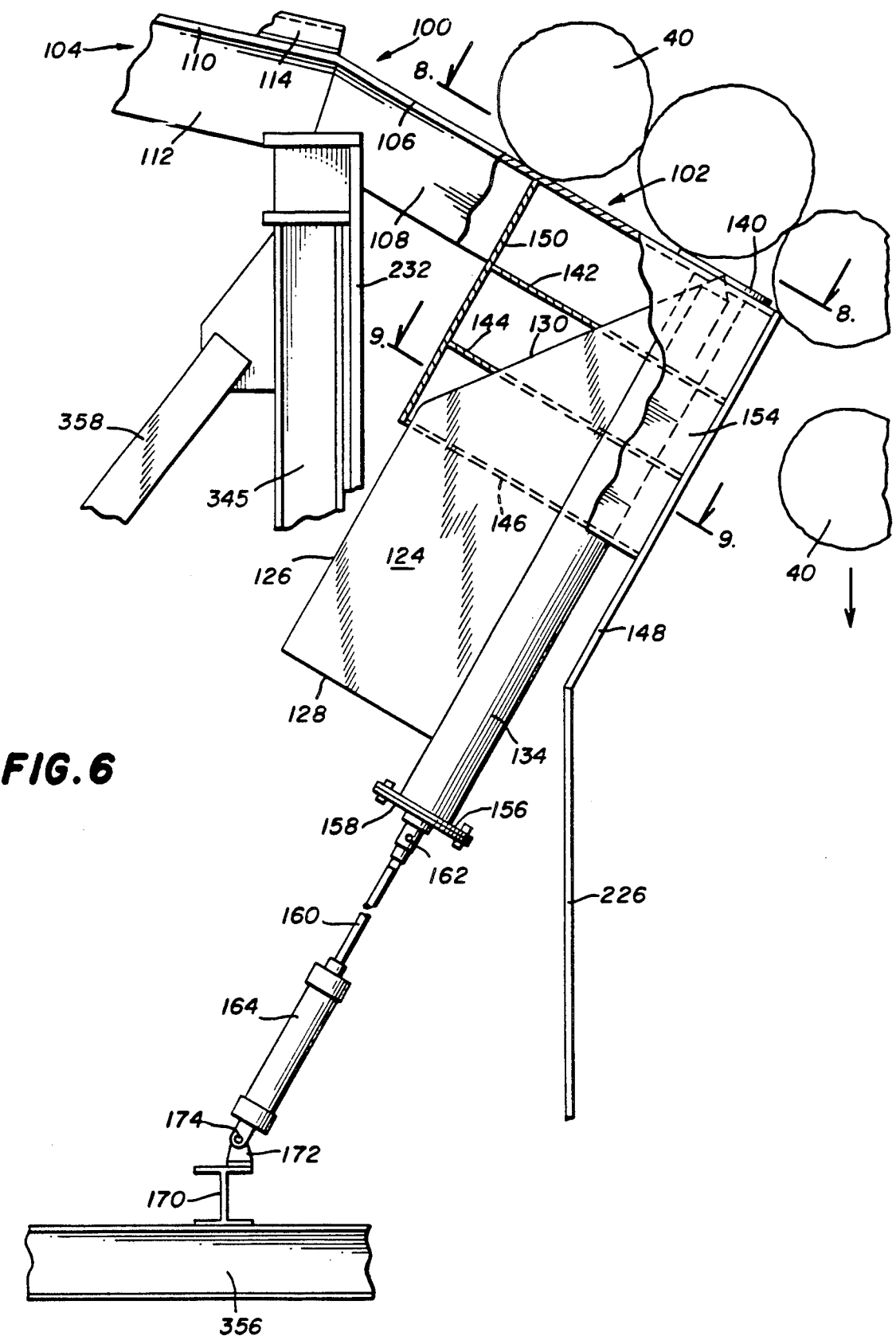
FIG. 6 is similar to FIG. 5 but with the long log stop means shown in fully retracted position.

Hydraulic cylinder 164 is provided with the usual inlets and outlets as required to force the piston therein in either direction as appropriate to force finger 120 upwards or downwards. FIG. 6 illustrates a finger 120 in its most downward position. When in the fully downward position each of the log stop fingers 120 is fully retracted so that the logs on the dead deck can roll freely into the feed chute. FIG. 5 illustrates a finger 120 in its most upward or fully extended position and, in phantom, in partially retracted position. When in the fully extended position each of the log stop fingers 120 provides maximum resistance against movement of the long logs from the dead deck into the feed chute. To meter a load of logs on the dead deck into the feed chute each of the fingers 120 is retracted simultaneously and substantially normal or perpendicular with respect to the deck front portion at the same rate so as to permit the logs to slide or roll over the finger tops and fall into the feed chute. The slanted edge 130 on each plate 124 facilitates movement of the logs over the fingers at a metered or controlled rate.

In operation a full grapple load of logs 50 is placed on the deck primary portion 104. The log stop fingers initially prevent the logs from entering the feed chute. The log stop fingers are gradually retracted allowing the logs to be metered into the debarking drum feed chute. Because the entire grapple load of logs is released instantaneously, the crane is immediately available for removing another load from a truck or rail car. Because of the deck surge capacity, the grapple size can be increased as opposed to feeding the logs directly into the chute. In addition, the logs move into the feed chute due to gravity rather than being driven by a chain conveyor system on a live deck. Log metering is accomplished using a simple, efficient, low cost hydraulic or electromechanical system. The log stop fingers are lightly loaded since the fingers are retracted from the logs rather than using them to move the entire log load. The rate of feed is directly related to the log stop finger retraction rate and is consistent with the desired crane cycle time. Drive speed adjustment can be provided to ensure rapid return of the fingers to the extended or outward position after metering the whole grapple load into the debarking drum.

Figure 2:
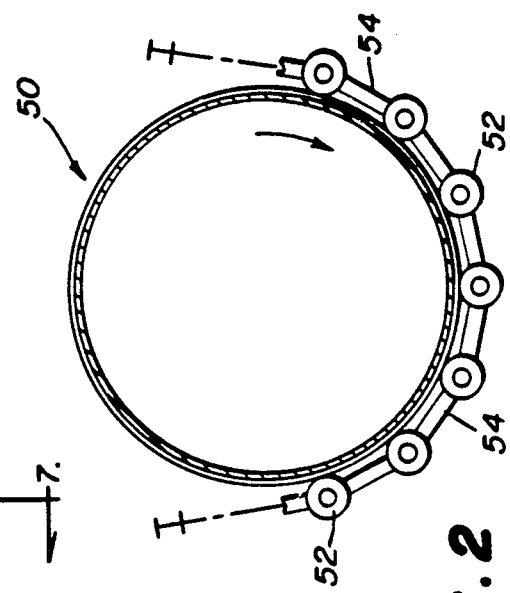
FIG. 2 is an end sectional view of the debarking drum into which the logs are fed.

The debarking drum 50 illustrated in FIGS. 1, 2 and 3 is of the suspended type disclosed in U.S. Pat. No. 3,863,902. The debarking drum 50 is supported on wheels 52 mounted on at least a pair of spaced apart nontraveling chains 54 which suspend the drum in cradled arrangement with the chains in tension. A trunnion supported drum, such as disclosed in U.S. Pat. No. 3,783,918 may also be used in conjunction with the described dead deck and feed chute.

The foregoing detailed description has been given for clearness of understanding only, and no unnecessary limitations should be understood therefrom, as modifications will be obvious to those skilled in the art.

What is claimed is:

1. Apparatus for feeding logs into a feed chute comprising:
    a continuous dead deck extending laterally outwardly and sloping upwardly from adjacent a chute first side top edge;
    the chute having a bottom downwardly sloping from an upper end to a lower delivery end substantially lower than the dead deck;
    the sloping dead deck being capable of supporting a grapple load pile of side-by-side logs substantially parallel to the chute opening;
    the sloping dead deck having a primary portion of constant slope and a lower front portion of grater constant slope with a front edge from which logs can roll off and fall into the chute; and the sloping dead deck lower front portion projecting over the chute first side edge and having stop means which is movable from a first position, which retains a complete pile of logs on the dead deck, to different positions suitable for metering the logs into the chute.

2. Apparatus for feeding logs into a feed chute comprising:

a continuous dead deck extending laterally outwardly and sloping upwardly from adjacent a chute first side top edge;

the chute having a bottom downwardly sloping from an upper end to a lower delivery end substantially lower than the dead deck;

the sloping dead deck being capable of supporting a grapple load pile of side-by-side logs substantially parallel to the chute opening;

the sloping dead deck having a lower front portion with a front edge from which logs can roll off and fall into the chute;

the sloping dead deck lower front portion having stop means which is movable from a first position, which retains a complete pile of logs on the dead deck, to different positions suitable for metering the logs into the chute;

the stop means comprising a plurality of fingers, displaceable by hydraulic means, substantially normal with respect to the deck lower front portion;

at least some of the fingers comprising a metal rod connected to a piston rod of the hydraulic means;

the metal rod having means connected thereto which long logs contact and are thereby temporarily restrained against gravity movement down the sloped deck into the chute; and a tube telescopingly arranged with respect to the metal rod for axial displacement of the rod.

3. Apparatus for feeding logs into a feed chute comprising:

a continuous dead deck extending laterally outwardly and sloping upwardly from adjacent a chute first side top edge;

the chute having a bottom downwardly sloping from an upper end to a lower delivery end substantially lower than the dead deck;

the sloping dead deck being capable of supporting a grapple load pile of side-by-side logs substantially parallel to the chute opening;

the sloping dead deck having a lower front portion with a front edge from which logs can roll off and fall into the chute;

the sloping dead deck lower front portion having stop means which is movable from a first position, which retains a complete pile of logs on the dead deck, to different positions suitable for metering the logs into the chute;

the stop means comprising a plurality of fingers, displaceable by hydraulic means, substantially normal with respect to the deck lower front portion;

at least some of the fingers comprising a metal rod connected to a piston rod of the hydraulic means;

the metal rod having means connected thereto which long logs contact and are thereby temporarily restrained against gravity movement down the sloped deck into the chute;

the metal rod having a metal plate positioned radially and axially to the rod and connected thereto with said plate having an outer radially positioned edge which the logs contact;

the apparatus including guide means for axial displacement of the rod and metal plate; and the guide means including a stationary tube in which the metal rod is telescopically movable and a stationary slot in which the metal plate is displaceable.

4. Apparatus for feeding logs into a feed chute, such as a debarking drum feed chute, comprising:

a generally U-shaped feed chute curved at the bottom and with a log-receiving open top and downwardly sloping from an upper end to a lower delivery end;

the chute having opposite spaced apart upwardly extending first and second sides and with at least the first side having a substantially horizontal top edge;

a dead deck extending laterally outwardly and sloping upwardly from adjacent the chute first side top edge;

the sloping dead deck being capable of supporting a grapple load pile of side-by-side logs substantially parallel to the chute opening;

the sloping dead deck having a front portion with a front edge from which logs can roll off and fall into the chute;

the sloping dead deck front portion having stop means which is movable from a first position which retains a complete pile of logs on the dead deck to different positions suitable for metering the logs into the chute;

the stop means comprising a plurality of fingers, displaceable by hydraulic means, substantially normal with respect to the deck front portion;

at least some of the fingers comprising a metal rod connected to a piston rod of the hydraulic means;

the metal rod having means connected thereto which logs contact and are thereby temporarily restrained against gravity movement down the sloped deck into the chute; and a tube telescopingly arranged with respect to the metal rod for axial displacement of the rod.

5. Apparatus for feeding logs into a feed chute capable of handling from one to a plurality of logs at the same time, comprising:

a generally U-shaped feed chute curved at the bottom and with a log receiving open top and downwardly sloping from an upper end to a lower delivery end;

the feed chute having opposite spaced apart upwardly extending first and second sides and with at least the first side having a substantially horizontal top edge;

a continuous dead deck extending laterally outwardly and sloping upwardly from adjacent the chute first side top edge;

the sloping dead deck being capable of supporting a grapple load pile of side-by-side logs substantially parallel to the chute opening;

the sloping dead deck having a top on which logs can move by gravity down the sloping deck toward the chute;

the sloping dead deck having a front portion with a front edge from which logs can roll off and fall into the chute;

the sloping dead deck front portion having stop means which is movable from a first position, which retains a complete pile of logs on the dead deck, to different lower positions suitable for metering the logs at a rate from one to a plurality of logs at the same time into the chute;

only the stop means preventing the logs from moving by gravity down the deck and into the chute;

the stop means comprising a plurality of fingers displaceable by hydraulic means substantially normal with respect to the deck front portion;

at least some of the fingers comprising a metal rod connected to a piston rod of the hydraulic means;

each metal rod having log contacting means connected thereto and which logs contact and are thereby temporarily restrained against gravity movement down the sloped deck into the chute;

the log contacting means is a metal plate joined to the rod along the longitudinal axis of the rod and positioned so that said axis is in substantially the same plane as the plate, with said plate having an outer edge which the logs can contact; and guide means for axial displacement of each rod and metal plate, the guide means including a stationary tube in which each metal rod is telescopically movable; and a stationary slot in which each metal plate is displaceable.

* * * * *

UNITED STATES PATENT AND TRADEMARK OFFICE
CERTIFICATE OF CORRECTION

PATENT NO. : 5,083,897

DATED : January 28, 1992

INVENTOR(S) : JIMMY W. HAND ET AL

It is certified that error appears in the above-identified patent and that said Letters Patent is hereby corrected as shown below:

Column 6, last line, change "grater" to -- greater --; column 8, line 13, before "chute" insert -- feed --.

Signed and Sealed this

Thirteenth Day of April, 1993

*Attest:*

STEPHEN G. KUNIN

*Attesting Officer*  *Acting Commissioner of Patents and Trademarks*